Patented June 24, 1941

2,246,635

UNITED STATES PATENT OFFICE 2,246,635

PROCESS FOR PREPARING IRREVERSIBLE STARCH DERIVATIVES

Fredrik André Möller, Groningen, Netherlands, assignor to Naamlooze Vennvotschap: W. A. Scholten's Chemische Fabrieken, Groningen, Netherlands, a corporation of the Netherlands No Drawing. Application September 22, 1937, Serial No. 165,226. In the Netherlands October 26, 1936

7 Claims. (Cl. 260—10)

It is well known that starch products which swell or dissolve in cold water can be manufactured by mixing starch with a small amount of water, suddenly heating the mixture pressed into thin layers to a temperature above the gelatinizing point and simultaneously or immediately thereafter drying the material. By grinding the dry mass the so-called cold swelling starches are obtained which have the property of swelling with water in the cold to a thick paste, and it is to be understood that when using the term "cold swelling starch" in the specification and claims only the starch products which are obtained after the method indicated above are meant. This treatment does not effect a substantial chemical hydrolysis of the starch but only a mechanical disintegration of the starch granules and it is therefore carried out without using chemicals exerting a hydrolizing action on the starch, such as those which are used in the manufacture of the so-called "soluble" or "thin boiling" starches, whereby starch products are obtained, which must be heated with water in order to produce a thin paste or solution. If desired, chemical substances preventing the formation of lumps when dissolving the cold swelling starch in water, e. g. alkaline substances, magnesium salts or aluminium salts, may be added; substances of this character may have a favorable influence on the mechanical disintegration of the starch granules but they do not effect at the same time a hydrolysis of the starch, as in the case of the thin boiling starches.

If the gels which are produced by the swelling of the above mentioned cold swelling starch products with cold water (which for convenience will hereinafter be called solutions) are dried again, e. g. when they are used as adhesives, a layer or film is produced which is not water-resistant. If the cold swelling starch solution has been used as an adhesive, the glued faces are soaked off in case of moistening by water. If textile materials have been sized with cold swelling starch, the size can be washed out again.

It has now been found that water-resistant layers can be obtained by using cold swelling starch which has been produced in the presence of a formaldehyde yielding compound and the object of the invention is a process for manufacturing cold swelling starches which is characterized by the feature that formaldehyde is added to the mixture of starch and water which is subjected to a heating process in a proportion of not less than 2½% and not substantially above 10%. The invention also relates to the production of solutions of the said cold swelling starch products.

It has been found that the starch products obtained in this way are not insoluble or non-swelling in water, as would be expected, but that when stirred with water they form a gel like the ordinary cold swelling starches. Notwithstanding the high temperature used which in the manufacture of cold swelling starch as a rule substantially exceeds 100°, the formaldehyde seems to be combined with the starch in such a manner that the starch has not lost its swelling power, which most probably can be ascribed to the short duration of the treatment in combination with the very high starch concentration.

If now the said cold swelling starch solutions are used e. g. as adhesives or sizes, it further appears that the layer produced by drying becomes gradually insoluble. Probably a condensation occurs which has the effect that the layer after e. g. a period of some weeks has become completely water-resistant. If the layer is strongly heated during or after drying, the insolubility will occur immediately even after heating for a short period. This property is very remarkable since the formaldehyde starch itself swells very well in cold water and does not lose this property when stored in dry condition.

It was already known that starch can be converted into insoluble derivatives with formaldehyde by reaction with formaldehyde at elevated temperature. It has also been proposed to manufacture condensation products of thin boiling starches with formaldehyde. In both cases products are obtained which do not swell or dissolve in cold water and which do not have the favorable properties of the starch products obtained by converting starch into cold swelling products in the presence of a formaldehyde yielding compound.

Instead of formaldehyde I can also use substances producing formaldehyde by decomposition, e. g. hexamethylenetetramine, paraformaldehyde, trioxymethylene and the like. The use of such substances has often advantages because during the action of the same on starch less formaldehyde will be lost by evaporation. The decomposition in solution can be promoted by the addition of acid.

According to the invention the water-resistance of the layers, which are obtained by drying the solutions of cold swelling or cold soluble starches, which are produced in the manner described above, can be considerably improved by adding products which promote the condensation of the starch with the aldehyde and which hereinafter will be called catalysts. To this end a large number of inorganic or organic salts are suitable, especially acid or salts or salts having an acid reaction, e. g. sodium chloride, sodium sulphate, ammonium chloride, ammonium rhodanide, sodium bisulphite, monophosphates, soda, sodium acetate or sodium bilactate. Acids may also be added, preferably organic acids or weak inorganic acids, such as acetic acid and phosphoric acid, in order to prevent a substantial decomposition of the starch. Further mixtures of two or more of the said substances can be used.

The above mentioned catalysts promoting the condensation may only be added just before, during or after dissolving the aldehyde-cold swelling starch, since otherwise the property of the starch to swell or to dissolve in cold water is lost or reduced. If the catalyst is added before the manufacturing of the formaldehyde-swelling starch, an insoluble or insufficiently swelling product is obtained. If the catalyst is mixed with the starch after the manufacturing process, the product often will lose after some time its property of swelling with water.

The invention may be carried out by preparing a mixture of the catalyst with the cold swelling starch (cold swelling starch A), which, in order to prepare the starch solutions producing the water resistant layers, is dissolved together with the aldehyde-cold swelling starch (cold swelling starch B). The mixture of swelling starch and catalyst can be obtained by adding the catalyst to the ready cold swelling starch or to the moist starch, before it is converted into cold swelling starch by heating. In some cases the cold swelling starch A and the cold swelling starch B can be mixed in dry condition and brought upon the market in this form, without the formaldehyde-cold swelling starch becoming insoluble. In other cases it is preferable to keep the two preparations separate, so that the formaldehyde-cold swelling starch and the catalyst can only act upon one another, when they are dissolved in water. The embodiment described above is very important for practice. In this manner easily soluble starch products are made available, which e. g. need not be boiled with the risk of premature condensation; they are brought upon the market ready to hand and may be applied for technical purposes, where up to now it was not possible to produce water-resistant layers in such a simple manner.

According to the invention the obtained result can be further improved by adding to the cold swelling starch solution substances, capable of producing condensation products of synthetic resin character with the aldehyde, e. g. phenols, urea, urea derivatives and other substances which are used for the manufacture of synthetic resin. Small quantities of the said additions already have a considerable influence on the properties of the cold swelling starch layers obtained.

A simple method of adding the said synthetic resin components consists in that they are mixed with the preparation indicated hereabove as cold swelling starch A, containing the catalyst for the condensation of starch with formaldehyde. The synthetic resin component can also be mixed separately with cold swelling starch. In both cases the mixing operation can take place before, during or after the manufacturing process of the cold swelling starch. By dissolving the said cold swelling starch preparations a solution is obtained, containing both the aldehyde and the other synthetic resin component, so that during and after drying the solution a complex of insoluble formaldehyde-cold swelling starch and synthetic resin can be formed. The insolubilisation of the said complex can be promoted by heating the swelling starch solution. This is generally effected by heating the textile goods which have been treated with the cold swelling starch solution during or after drying.

The catalysts added for condensing formaldehyde with the cold swelling starch usually promote the condensation of the synthetic resin component with formaldehyde. If desired specific synthetic resin condensing agents can also be added.

The water resistancy of the layers obtained in the manner described above should be attributed in the first place to the formation of an insoluble starch derivative and only to a smaller extent to the formation of insoluble resin. This appears among other things from the fact that the mixtures used consist for a very large part of cold swelling starch and only for a smaller part of insoluble resin. It is also shown by the fact that layers which are obtained in a similar manner from mixtures containing starch products which are disintegrated to a further extent than cold swelling starch, are much inferior. Moreover the heating applied must be generally considered insufficient for effecting a complete condensation to synthetic resin.

The starch solutions according to the invention which when dried produce layers which in the long run are water-resistant may be applied for various purposes, for example as adhesives, as binding agents for paints, as paper size, as thickening agents in paper and textile printing and as binding agents for all kinds of granular, fibrous and powdered materials. The films formed by drying are more resilient than the starch films which have been obtained until now. This is also the reason why for example in case the starch products described are used as binding agents for paints a further coating of size can be applied without danger of peeling off, which often occurs with the starch products used previously.

The products according to the invention, especially those containing synthetic resins or synthetic resin components are suitable for sizing purposes in the textile industry. After being impregnated with the starch paste, the fabric is dried in the heat, for example at a temperature of 80–120° C. and/or calendered or ironed in the heat. The size obtained in this manner will be better resistant against washing than all starch products or combinations thereof, which have been used up to now.

The amount of formalin (formaldehyde solution of 40%) which can be incorporated into the cold swelling starch, generally does not exceed about 25%. If too much is added, the cold swelling starch will have unsatisfactory swelling properties. The proportion of synthetic resin component to be added is also limited thereby, unless additional formaldehyde in the form of hexamethylenetetramine or another solid compound producing formaldehyde by decomposition is added to the cold swelling starch B.

In the various processes described above, it is possible to substitute ordinary starch, for example potato starch, for a part of the cold swelling starch. For example it is possible to boil a mixture of formaldehyde-cold swelling starch and potato starch with water and an acid or an ammonium salt, whereby a satisfactory size is obtained.

*Example 1.*—100 to 250 grams of formaldehyde of 40% are diluted with 1½ litres of water. 1 kilogram of corn- or potato-starch is added and the mixture is converted into cold swelling starch in the usual manner.

*Example 2.*—The product obtained according to Example 1 is mixed with 10-20% of finely comminuted tartaric acid and thereupon dissolved by stirring it in cold water.

*Example 3.*—50 grams of phosphoric acid are mixed with 1½ litres of water. Thereupon 1 kilogram of wheat- or tapioca-starch is added thereto. The mixture is converted into cold swelling starch in the usual manner.

This cold swelling starch is mixed with an equal weight of cold swelling starch according to Example 1 and dissolved in water.

*Example 4.*—200 grams of urotropine are dissolved in 2 litres of water. The solution is stirred with 1 kilogram of potato-starch. The mixture is converted into cold swelling starch in the usual manner and mixed with 100-250 grams of sodium monophosphate.

*Example 5.*—20-100 grams of urea or the equivalent amount of thiourea are dissolved in 1¾ litres of water. Thereupon 1 kilogram of wheat flour is added. The mixture is converted into swelling starch, subsequently mixed with an equal weight of the starch produced according to Example 4 and dissolved in the usual manner.

*Example 6.*—150 grams of ammonium chloride are dissolved in 1½ litres of water with 20-100 grams of urea and 10 grams of carbolic acid and subsequently mixed with 1 kilogram of sago flour. The mixture is converted into cold swelling starch in the usual way. Thereupon the product is mixed with an equal weight of the cold swelling starch obtained according to Example 4. An additional quality of 10% of sodium bi-lactate can be added to the mixture.

*Example 7.*—150-160 grams of urotropine, 180 grams of urea, 100 grams of sodium chloride and 50 grams of phosphoric acid are dissolved in 2 litres of water and mixed with 1 kilogram of potato starch. This mixture is converted into cold swelling starch in the usual way. The product obtained is insoluble in water.

The expression "formaldehyde yielding compounds" as employed herein, is intended to cover not only formaldehyde itself, but its polymers or any other substances splitting off formaldehyde as it has been found that such substances or polymers may also be used in place of formaldehyde itself.

I claim:

1. A process of manufacturing starch products which comprises mixing starch with a small amount of water and a substance of the group consisting of formaldehyde and formaldehyde yielding products in a proportion of not less than 2½% and not substantially above 10%, calculated as formaldehyde, suddenly heating the mixture while pressed into thin layers, to a temperature well above the gelatinizing point whereby the material is simultaneously dried, and then grinding the dry material.

2. A process of manufacturing starch solutions which comprises dissolving a starch product obtained by mixing starch with a small amount of water and a substance of the group consisting of formaldehyde and formaldehyde yielding products in a proportion of not less than 2½% and not substantially above 10%, calculated as formaldehyde, suddenly heating the mixture while pressed into thin layers, to a temperature well above the gelatinizing point whereby the material is simultaneously dried and then grinding the dry material, in water and adding a catalyst for promoting the condensation of formaldehyde with starch.

3. A process of manufacturing starch solutions which comprises dissolving a starch product obtained by mixing starch with a small amount of water and a substance of the group consisting of formaldehyde and formaldehyde yielding products in a proportion of not less than 2½% and not substantially above 10%, calculated as formaldehyde, suddenly heating the mixture while pressed into thin layers, to a temperature well above the gelatinizing point whereby the material is simultaneously dried and then grinding the dry material, in water and adding a cold swelling starch into which a catalyst promoting the condensation of formaldehyde with starch has been incorporated.

4. A process of manufacturing starch products which comprises mixing starch with a small amount of water and a substance of the group consisting of formaldehyde and formaldehyde yielding products in a proportion of not less than 2½% and not substantially above 10%, calculated as formaldehyde, suddenly heating the mixture while pressed into thin layers, to a temperature well above the gelatinizing point whereby the material is simultaneously dried, then grinding the dry material and subsequently mixing the ground material with a cold swelling starch into which a catalyst promoting the condensation of formaldehyde with starch has been incorporated.

5. A process of manufacturing starch solutions which comprises dissolving a starch product obtained by mixing starch with a small amount of water and a substance of the group consisting of formaldehyde and formaldehyde yielding products in a proportion of not less than 2½% and not substantially above 10%, calculated as formaldehyde, suddenly heating the mixture while pressed into thin layers, to a temperature well above the gelatinizing point whereby the material is simultaneously dried and then grinding the dry material, in water and adding a catalyst promoting the condensation of formaldehyde with starch and a substance taken from a group consisting of phenols and ureas capable of reacting with formaldehyde so as to form synthetic resin-like condensation products.

6. A process of manufacturing starch solutions which comprises dissolving a starch product obtained by mixing starch with a small amount of water and a substance of the group consisting of formaldehyde and formaldehyde yielding products in a proportion of not less than 2½% and not substantially above 10%, calculated as formaldehyde, suddenly heating the mixture while pressed into thin layers, to a temperature well above the gelatinizing point whereby the material is simultaneously dried and then grinding the dry material, in water and adding a cold swelling starch into which a catalyst promoting the condensation of formaldehyde with starch and a substance taken from a group consisting of phenols and ureas capable of reacting with formaldehyde so as to form synthetic resin-like condensation products have been incorporated.

7. A process of manufacturing starch products which comprises mixing starch with a small amount of water and a substance of the group consisting of formaldehyde and formaldehyde yielding products in a proportion of not less than 2½% and not substantially above 10%, calculated as formaldehyde, suddenly heating the mixture while pressed into thin layers, to a temperature well above the gelatinizing point whereby the material is simultaneously dried, then grinding the dry material and subsequently mixing the ground material with a cold swelling starch into which a catalyst promoting the condensation of formaldehyde with starch and a substance taken from a group consisting of phenols and ureas capable of reacting with formaldehyde so as to form synthetic resin-like condensation products have been incorporated.

FREDRIK ANDRÉ MÖLLER.